3,284,555
PROCESS FOR THE PRODUCTION OF SHAPED ARTICLES AND ARTICLES PRODUCED THEREBY
Joachim Löbering, 3 Herrnwiesstrasse, 8022 Munich-Grunewald, Germany
No Drawing. Filed Dec. 21, 1964, Ser. No. 420,156
Claims priority, application Germany, Dec. 21, 1963, L 46,649
9 Claims. (Cl. 264—182)

This invention relates to a process for the production of shaped articles from polyacrylonitrile or from monomeric acrylonitrile copolymerized with one or more other polymerizable comonomers; the invention also relates to improved shaped articles produced by the process.

Processes are known for producing fibers, filaments or foils from polyacrylonitrile alone or from acrylonitrile copolymerized with conventional comonomers, certain of which copolymers have improved properties when used as fibers or filaments in the manufacture of textiles. Organic or inorganic solvents are used for dissolving the polymerizates in the spinning solution, the inorganic solvents being concentrated solutions of specific salts.

In addition to the alkali rhodanides or thiocyanates, which are not included in this context, zinc chloride has been proposed as a solution-aiding salt in the form of concentrated solutions thereof and concentrations of 60 to 65 percent or more, by weight, have been indicated as useable for this purpose. Not only are these concentrated zinc chloride solutions employed for dissolving polymerized acrylonitrile in spinning solutions, but the salt solution has also been proposed as a medium for the polymerization reaction itself. In this latter case, the polymerizate is formed in the solvent itself by dissolving monomeric acrylonitrile, either with or without other comonomers, in the solvent and adding an appropriate catalyst so that a spinning solution is prepared in a direct-working process.

The high concentration of the salt solution is, however, disadvantageous in view of the fact that the dissolving salts are recovered in the process, i.e., the dilute spinning and washing baths are re-concentrated, by evaporation for example, to the concentration required for preparing the spinning solution.

In actual practice, the aforementioned high salt concentrations readily produce obstructions in pipe lines, as a result of crystallization, and the elimination of such obstructions causes an interruption in the process and also adversely affects the corrosion resistance of the equipment.

It has been found, moreover, that the polymerization rate of acrylonitrile in concentrated zinc chloride solutions is very high and can be regulated only with difficulty. For this reason, non-uniform polymerizates are often produced and the end products, i.e. fibers and filaments, vary considerably in their properties when employed in textiles.

The foregoing process has been improved by using a so-called dissolving salt, for example zinc chloride, together with a non-dissolving salt, for example calcium chloride or magnesium chloride, in order to reduce the polymerization rate. It has been indicated that the minimum concentration of both salts can be reduced to 55 percent, by weight, in particular instances. However, it has been found that the specified concentration is not sufficient in actual practice to obtain a perfect spinning solution. The inventors of this known process also disclose specific examples in which the total concentration is 60 percent by weight and more. It has been found by experience that such concentrations are in a range which adversely affects the evaporation process.

It has also been found that particularly favorable dissolving and working conditions are created if zinc chloride and sodium chloride are utilized, i.e., only the latter and not the alkaline earth chlorides. In this connection, it is an essential requirement that the quantitative relation of the two salts be stoichiometric and correspond to the complex salt $NaZnCl_3$. In this case, and in this case only, it is possible to operate, in practice, with minimum concentrations of 55 percent by weight, or somewhat less.

On the other hand, inorganic acids, particularly oxygen acids, have been proposed as solvents for polyacrylonitrile in the preparation of spinning solutions. Thus, the use has been proposed of 58 percent nitric acid ($HNO_3$) or 56 percent perchloric acid ($HClO_4$), or 85 percent phosphoric acid ($H_3PO_4$). In this connection, reference is made to French Patent No. 1,052,286, British Patent No. 744,278, and Italian Patent No. 504,150. The process described in these three patents is characterized by a number of considerable disadvantages as regards process techniques. For example, it has been disclosed in the aforesaid patents that the temperatures of the precipitating bath should be below 10° C., preferably between 0 and —20° C. This necessitates additional power requirements for the operation of the cooling equipment and special apparatus for spinning. Further, according to the known process, the spinning baths additionally contain salts which are formed with anions other than that of the dissolving acid employed. Thus, an admixture of magnesium chloride of 32 percent by weight has been specified.

The presence of these salts causes considerable difficulties in the recovery process in that the salts must be again removed from the spinning and washing baths in order that the pure acid can be recovered for re-use as a solvent. Further, the acids employed at the high concentrations of 56 to 85 percent by weight required in the known process also result in a gradual decomposition of the polymerizate molecules, which is apparent even from the aforementioned patent specifications. Finally, corrosion resulting from the use of highly concentrated phosphoric acid must be considered, and it is difficult to obtain equipment guarantees where such highly concentrated acids are employed.

The process of the present invention relates to the use of the zinc sodium complex salt in combination with phosphoric acid as a dissolving medium for polyacrylonitrile and as a solvent medium for the polymerization of the monomer, or monomers, directly in the spinning solution. The invention further relates to spinning such solutions into precipitating baths which have the same composition of zinc-sodium complex salt and phosphoric acid as the spinning solution but in lower concentrations. The invention also includes recovery of the solvent medium by evaporation of the precipitating and washing baths. In the process of the invention, it is possible to operate with concentrations of salt considerably less than 55 percent by weight and the normal working range is from about 10 to about 55 percent by weight of $NaZnCl_3$. Particularly favorable concentrations are in the range of 15 to 50 percent by weight. The quantity of phosphoric acid may be in the range of about 2 to 35 percent by weight.

The process of the invention has a number of advantages:

(1) The total concentration of salts is so low that no difficulties arise in the recovery thereof during the concentration process, which is normally effected by evaporation.

(2) The concentration of phosphoric acid is so low that the polymerizate is not decomposed.

(3) There are no corrosion difficulties, as exist in the case where higher acid concentartions, as set forth above, are employed. In this connection, the process of the invention is not primarily directed to the protection of apparatus against corrosion but rather ensures that no traces of iron are introduced into the reaction solution. Whereas only the dissolution of previously prepared polymerizates is included in the patents mentioned above, the modern dissolving polymerization reaction is employed in the present invention. For this reason, it is mandatory that all traces of iron and the like be kept out of the solution so that the latter is not adversely affected.

(4) The additional use of phosphoric acid has a retarding effect on the polymerization rate. When using concentrated salt solutions of conventional composition, the polymerization proceeds very rapidly, as set forth above. For this reason, in addition to other reasons discussed below, it is possible to maintain a specific polymerization rate only with great difficulty. Accordingly, in other processes it has been attempted to regulate the polymerization rate, for example, by the addition of minimal quantities of copper. The quantity of copper ions, however, is continually increased by the evaporation of the solutions to be regenerated so that complicated processes are again required to initially remove the copper, even though it must be again added to the recovered solvent in a constantly uniform concentration. In the process of the present invention, the combination of salt and phosphoric acid results in a reduced polymerization rate, whereby it is possible to easily regulate the degree of polymerization. The quality of the fibers and filaments produced by the present process is thereby considerably improved.

(5) The aforementioned excessive rate of polymerization, which is inevitable in process heretofore known, has another disadvantage, i.e. the quantity of heat liberated during the reaction can not be drawn off rapidly enough, with the result that additional uncontrollable changes in the polymerizate ensue. In order to achieve a controlled liberation of heat, it is necessary to depend upon specific equipment constructions, which confine the size of the apparatus to very narrow limits. Thus, if it is possible at all to draw off the reaction heat, the cost of the equipment is increased by the particular limitations thereon.

The retardation of the reaction rate in the process of the present invention has the desirable effect that the quantity of heat liberated within a given unit of time is reduced, which facilitates substantially the task of maintaining the temperature of the reaction mass constant. This latter is favorable insofar as the equipment required for the reaction is concerned and the uniformity of the polymerizate is improved as well because of the reduced temperature differences in this solution.

(6) Similarly to the case above-mentioned where the zinc-sodium complex salt was used alone as a dissolving medium, in the process of the present invention, the composition of the precipitating bath, i.e. the zinc-sodium complex and phosphoric acid, is the same as in the spinning mass but the concentration of these materials in the precipitating bath is lower. Thus, the process is advantageously performed using a concentration in the range of 5 to 25 percent by weight of total salt and acid in the precipitating baths. Further, it is not necessary to utilize the low temperatures required in the process of the patents specified above. The washing baths are automatically enriched with the dissolving intermediaries and are collected and re-used, depending upon their concentration, as precipitating baths or dissolving mediums, if necessary after being concentrated. The enriched precipitating baths are also recovered and re-used, after being concentrated to the desired concentration by evaporation. Accordingly, the fact that the precipitating bath and the spinning solution both contain the zinc-sodium complex salt and phosphoric acid makes it possible to easily operate the recovery process.

The catalysts used in the polymerization process are those which do not adversely affect the recovery process and which do not contaminate the precipitating or washing baths by decomposition. Suitable catalysts are, for example, hydrazine which decomposes to hydrogen, and peracetic acid which decomposes to acetic acid, the latter being removed by the evaporation process. Hypophosphoric acid and hydrogen peroxide also may be employed.

(7) A further important advantage of the present invention resides in the fact that the dyeability of fibers the filaments spun from solutions of the polymerizates according to the invention is very good even without the use of polymerizable comonomers. Thus, for example, acrylic acid or acrylamide or other carboxylic acids may be added to the polymerizable acrylonitrile monomer in order to improve the affinity of the resulting shaped article for dyestuffs. Many copolymers have undesirable properties, however, and it is, therefore, a particular advantage of the present invention that the addition of acrylic acid and similar comonomers may be omitted either entirely or partially if the process is performed using the dissolving intermediaries of the invention.

The invention will be further illustrated by reference to the following specific examples:

*Example 1*

An aqueous salt solution is prepared which contains 51 percent by weight of $NaZnCl_3$, and an addition of 7 percent by weight of $H_3PO_4$. 10 percent by weight of monomeric acrylonitrile (and, if desired, one or more comonomers) is stirred into the salt solution and dissolved. After the addition of hydrazine and peracetic acid, polymerization begins with the liberation of heat which must be removed by a cooling operation. The temperature of the reaction mass should not be permitted to exceed 40° C.

After 20 minutes, a large portion of the monomer has reacted and the mass becomes viscous. The mass is then heated to 60° C. whereupon the remaining part of the monomer is polymerized and the chemical reaction is complete. The resulting spinning solution can be spun after the conventional ventilation and filtration steps.

A precipitating bath is used which contains a total of 15 to 25 percent by weight of $NaZnCl_3$ and $H_3PO_4$ in the ratio employed in the polymerizing solution. The temperature of the precipitating bath is preferably 20° C.

*Example 2*

An aqueous salt solution is prepared which contains 25 percent by weight of $NaZnCl_3$ and 35 percent by weight of $H_3PO_4$. 10 percent by weight of monomeric acrylonitrile is stirred thereinto and dissolved in accordance with the procedure of Example 1 above. Hypophosphoric acid and hydrogen peroxide are employed as redox components. The liberated reaction heat is drawn off to an extent such that the temperature of the reaction mass does not exceed 40° C. Thereafter, heat is supplied so that the temperature of the reaction mass is increased to 60° C. The monomer then reacts to completion and the completed spinning solution is produced after a reaction time of approximately 60 minutes.

Further processing, after conventional filtration and ventilation, is in accordance with the procedure of Example 1 above.

*Example 3*

An aqueous salt solution is prepared which contains 29 percent by weight of $ZnCl_2$, 15 percent by weight of NaCl (equivalent to 44 percent of $NaZnCl_3$) and 10 percent by weight of phosphoric acid. 9 percent by weight of monomeric acrylonitrile and 1.5 percent by weight of a polymerizable comonomer are stirred into the solution and dissolved at 20° C. The polymerization reaction begins, after the addition of redox components, at a temperature of 30° C. and the reaction temperature is maintained for a period of 20 minutes by means of cooling the reaction vessel.

Heat is then supplied to the reaction mixture until a temperature of 70° C. is attained. The spinning mass reacts to completion at this temperature within a period of 30 minutes after which it is filtered and ventilated, and may be spun immediately.

The precipitating bath contains 20 percent of $ZnCl_2$, 10 percent by weight of NaCl and 6.8 percent by weight of $H_3PO_4$. The spinning temperature is 25° C.

The temperatures indicated in the foregoing examples are merely exemplary and may be either lower or higher than those specified. Thus, it is entirely possible to operate at the beginning of the reaction at a temperature of 15° C. and at the end of the reaction at a temperature of 80° C., which operation will result in a change of the properties of polymerizates and the spinning solution, and of the fibers, filaments or foils produced therefrom.

Also, the concentration of the complex salt may be broadly varied between about 10 and 55 percent by weight and the concentration of the phosphoric acid may be in the range of 2 to 35 percent by weight but the concentrations employed in the foregoing examples produce the most favorable results. Higher concentrations of salt and acid are also operable but the use of such higher concentrations results in the reappearance of process difficulties similar to those which have been discussed above.

It will be obvious to those skilled in the art that many modifications may be made within the scope of the present invention without departing from the spirit thereof, and the invention includes all such modifications.

What is claimed is:

1. A process for the production of a shaped article from acrylonitrile which comprises dissolving monomeric acrylonitrile in an aqueous solution of $NaZnCl_3$ and phosphoric acid, polymerizing the monomer in the presence of an oxidizing and a reducing agent to produce a spinning solution, and spinning the latter into a precipitating bath containing $NaZnCl_3$ and phosphoric acid in lower concentrations than in the spinning solution.

2. A process according to claim 1 in which the monomeric acrylonitrile is copolymerized with at least one polymerizable comonomer.

3. A process accordingly to claim 1 in which in the spinning bath the concentration of $NaZnCl_3$ is in the range of about 10 to 55 percent by weight and the concentration of phosphoric acid is in the range of about 2 to 35 percent by weight, based upon the total weight of salt solution.

4. A process according to claim 1 in which in the spinning bath the concentration of $NaZnCl_3$ is in the range of about 15 to 50 percent by weight and the concentration of phosphoric acid is in the range of about 5 to 30 percent by weight, based upon the total weight of salt solution.

5. A process according to claim 1 in which in the spinning bath the concentration of $NaZnCl_3$ is in the range of about 34 to 48 percent by weight and the concentration of phosphoric acid is in the range of about 5 to 20 percent by weight, based upon the total weight of salt solution.

6. A process according to claim 1 in which the oxidizing agent is peracetic acid and the reducing agent is hydrazine.

7. A process according to claim 1 in which the oxidizing agent is hydrogen peroxide and the reducing agent is hypophosphoric acid.

8. A process according to claim 1 in which the shaped article is a fiber.

9. A process according to claim 1 in which the shaped article is a foil.

References Cited by the Examiner
UNITED STATES PATENTS 3,107,971 10/1963 Yasawa et al. _____ 264—38

FOREIGN PATENTS 553,777 3/1958 Canada.

ALEXANDER H. BRODMERKEL, *Primary Examiner.*

ALFRED L. LEAVITT, *Examiner.*

F. S. WHISENHUNT, *Assistant Examiner.*